United States Patent
MacKenzie et al.

(10) Patent No.: US 11,076,147 B2
(45) Date of Patent: Jul. 27, 2021

(54) STEREOSCOPIC DISPLAY OF OBJECTS

(71) Applicant: Microsoft Technology Licensing, LLC, Redmond, WA (US)

(72) Inventors: Kevin J. MacKenzie, Sammamish, WA (US); Anatolie Gavriliuc, Kirkland, WA (US); Robert T. Held, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 16/160,368

(22) Filed: Oct. 15, 2018

(65) Prior Publication Data

US 2019/0052871 A1 Feb. 14, 2019

Related U.S. Application Data

(62) Division of application No. 14/697,572, filed on Apr. 27, 2015, now Pat. No. 10,136,124.

(51) Int. Cl.
*H04N 13/00* (2018.01)
*H04N 13/398* (2018.01)
(Continued)

(52) U.S. Cl.
CPC ............ *H04N 13/398* (2018.05); *G06F 3/01* (2013.01); *H04N 13/122* (2018.05);
(Continued)

(58) Field of Classification Search
CPC .... H04N 13/398; H04N 13/128; H04N 13/15; H04N 13/327; H04N 13/324;
(Continued)

(56) References Cited

U.S. PATENT DOCUMENTS 7,428,001 B2 * 9/2008 Schowengerdt ..... H04N 13/366
348/51
10,136,124 B2 11/2018 MacKenzie et al.
(Continued)

FOREIGN PATENT DOCUMENTS

CN 103226810 A 7/2013

OTHER PUBLICATIONS

Hoffman et al. (Vergence-accommodation conflicts hinder visual performance and cause visual fatigue J Vis.; available in PMC Jun. 1, 2010, (Year: 2010).*
(Continued)

*Primary Examiner* — Frank F Huang
(74) *Attorney, Agent, or Firm* — Newport IP, LLC; Scott Y. Shigeta

(57) ABSTRACT

Stereoscopic display technologies are provided. A computing device generates a stereoscopic display of an object by coordinating a first image and a second image. To reduce discomfort or to reduce diplopic content, the computing device may adjust at least one display property of the first image and/or the second image depending on one or more factors. The factors may include a time period associated with the display of the object, the vergence distance to the object, the distance to the focal plane of the display, contextual data interpreted from the images and/or any combination of these and other factors. Adjustments to the display properties can include a modification of one or more contrast properties and/or other modifications to the images. The adjustment to the display properties may be applied with varying levels of intensity and/or be applied at different times depending on one or more factors and/or contextual information.

20 Claims, 7 Drawing Sheets

(51) Int. Cl.
*H04N 13/324* (2018.01)
*H04N 13/327* (2018.01)
*H04N 13/122* (2018.01)
*H04N 13/144* (2018.01)
*H04N 13/15* (2018.01)
*H04N 13/128* (2018.01)
*G06F 3/01* (2006.01)

(52) U.S. Cl.
CPC ......... *H04N 13/128* (2018.05); *H04N 13/144* (2018.05); *H04N 13/15* (2018.05); *H04N 13/324* (2018.05); *H04N 13/327* (2018.05); *H04N 2013/0074* (2013.01)

(58) Field of Classification Search
CPC ............... H04N 13/144; H04N 13/122; H04N 2013/0074; H04N 5/2252; H04N 5/23293; H04N 5/33; H04N 9/07; H04N 5/23216; H04L 67/306; G06F 3/01; G06F 3/017; G06F 3/04812; G06F 3/0304; G06K 9/00671; G06K 9/2018; G06K 9/2036
See application file for complete search history.

(56) References Cited

U.S. PATENT DOCUMENTS

2008/0117289 A1* 5/2008 Schowengerdt ..... G02B 26/005
348/46
2013/0342525 A1* 12/2013 Benko .................... G06F 3/013
345/419

OTHER PUBLICATIONS

"Second Office Action Issued in Chinese Patent Application No. 201680024520.3", dated Jun. 11, 2019, 30 Pages.
"Third Office Action and Search Report Issued in Chinese Patent Application No. 201680024520.3", dated Dec. 12, 2019, 14 Pages.
"Office Action Issued in European Patent Application No. 16717054.7", dated Apr. 9, 2019, 6 Pages.
"First Office Action Issued in Chinese Patent Application No. 201480067158.9", dated Oct. 31, 2018, 18 Pages.

* cited by examiner

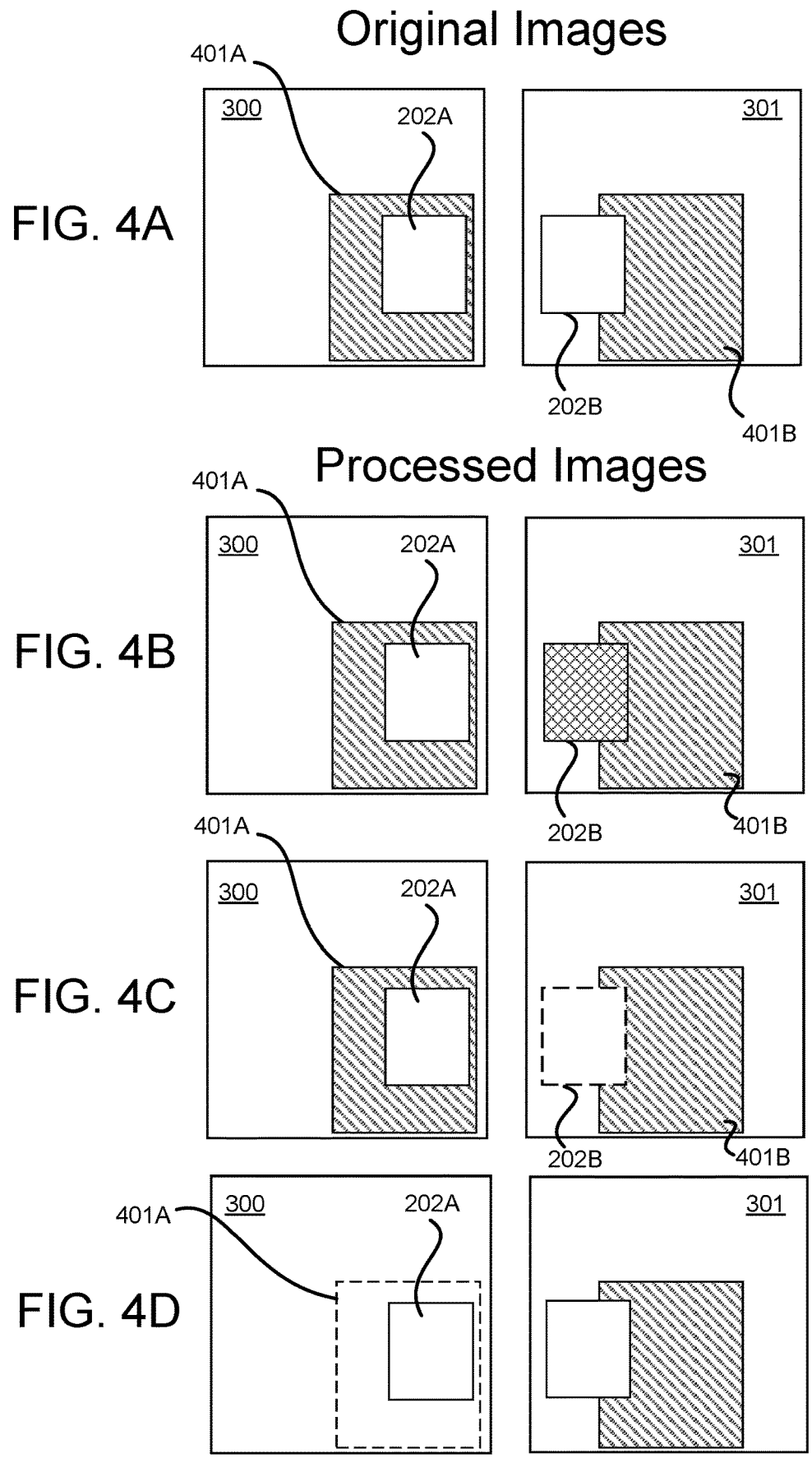

STEREOSCOPIC DISPLAY OF OBJECTS

CROSS REFERENCE TO RELATED APPLICATION

This filing is a divisional application of, and claims priority to, U.S. patent application Ser. No. 14/697,572, entitled "IMPROVED STEREOSCOPIC DISPLAY OF OBJECTS" and filed Apr. 27, 2015, the contents of which are incorporated herein by reference in their entirety.

BACKGROUND

There is a growing population of users that interact with computing devices that utilize stereroscopic display technologies. Stereoscopy, also referred to herein as stereoscopic or three-dimensional (3D) imaging, is a technique for creating or enhancing the display of objects by means of stereopsis for binocular vision. Most stereoscopic methods present two images to a user: one image displayed to the left eye and another image displayed to the right eye. These two-dimensional (2D) images are positioned relative to each eye to give the perception of 3D depth. This technique is distinguished from 3D technologies that render and display multiple surfaces of an object, which enables users to view an object from different perspectives.

In some devices, which may be a head-mounted display (HMD), existing stereroscopic display technologies may cause user discomfort and/or fatigue. For example, to observe a virtual object, the user must "fuse" a rendered object, e.g., the user is required to coordinate each eye with each of the independently positioned images. In conventional stereoscopic displays, the stimulus to vergence (absolute binocular disparity) is manipulated to simulate different depths in the world, but the stimulus to accommodation remains fixed at the display surface. This is the well-known vergence-accommodation conflict. This conflict can lead to discomfort while viewing stereoscopically presented 3D content. In some situations, the position of each image may cause a user to see "double" images. Such issues, and others, with current technologies may lead to a less than desirable user experience or cause a device to become unusable.

It is with respect to these and other considerations that the disclosure made herein is presented.

SUMMARY

Concepts and technologies are described herein for providing an improved stereoscopic display of objects. A computing device causes a stereoscopic display of an object by coordinating a display of a first image and a second image, one to each eye. The computing device may adjust at least one display property of the first image and/or the second image depending on one or more factors. The factors may include a time period associated with the display of the object, the vergence distance for the object, the distance to the display's focal plane, contextual data interpreted from the images and/or any combination of these and other factors. Adjustments to the display properties can include, for example, a modification of one or more contrast properties, the application of a process that distorts or obscures one or more objects, and/or the application of other modifications to one or both images. The adjustment to the display properties may be applied with varying levels of intensity at specified times depending on one or more factors and/or contextual information interpreted from the images and other data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-4D illustrate various modifications that may be applied to one or more images used for generating a stereoscopic display of an object and a background object;

DETAILED DESCRIPTION

Figure 1:
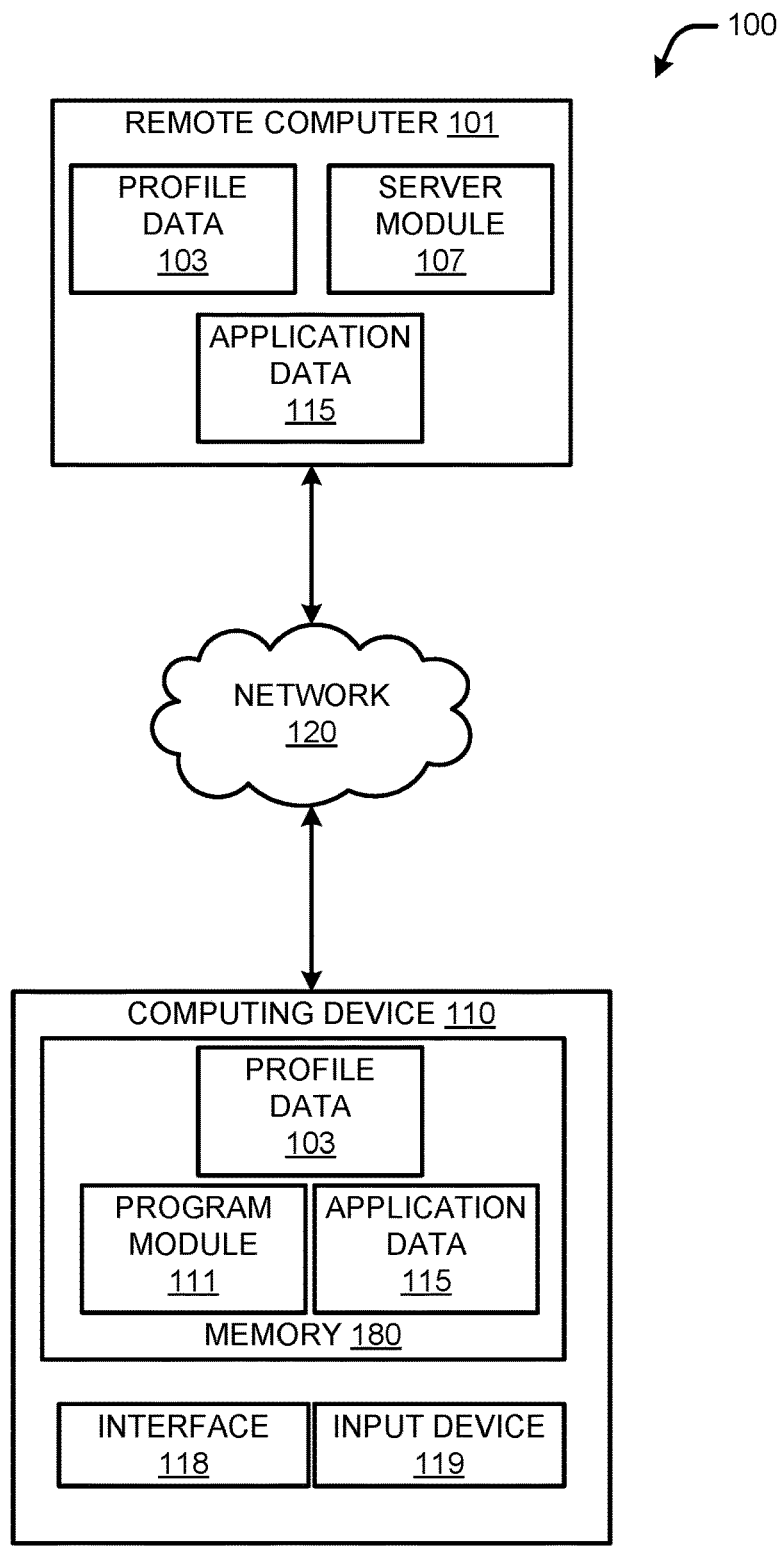
FIG. 1 is a block diagram showing several example components for providing an improved stereoscopic display of objects.

Concepts and technologies are described herein for providing an improved stereoscopic display of objects. A computing device creates a stereoscopic representation of an object by coordinating a display of a first image and a second image. The computing device may adjust at least one display property of the first image and/or the second image depending on one or more factors. The factors may include a time period associated with the display of the object, the vergence distance for the object, the distance to the display's focal plane, contextual data interpreted from the images and/or any combination of these and other factors. Adjustments to the display properties can include, for example, a modification of one or more contrast properties, the application of a process that distorts or obscures one or more objects, and/or the application of other modifications to one or both images. The adjustment to the display properties may be applied with varying levels of intensity at specified times depending on one or more factors and/or contextual information interpreted from the images.

In some configurations, an object is displayed in the first image and the second image. The on-screen position of the object in each image is based on the object's vergence distance. In addition, the display of the object may be based on the distance to the display's focal plane. As will be described in more detail below, in some configurations, at least one display property of the first image or the second image is adjusted if the difference between the vergence distance and the distance to the focal plane exceeds a threshold. In other examples described below, adjustments are made to one or both images based on the vergence distance of one or more objects.

In some configurations, contextual information may be derived from the images and/or any other input data. Adjustments may be made to one or both images based on the contextual information. For example, the first image and the second image may each display a first representation and a second representation of an object. Based on the size, position, and/or other characteristics (including environmental context) of the representations, one or both representations may be selected to be modified. If one or more parameters for a given representation exceeds a threshold, e.g., the vergence distance does not meet or exceed a threshold, that representation may be modified. Configurations utilizing contextual information are described in more detail below and shown in FIGS. 3A-3H and other figures.

In some configurations, other properties, such as a contrast ratio between an object and a background object, may be used to process one or more image adjustments. In one illustrative example, techniques herein adjust at least one representation of an object that would result in the smallest change in contrast between a background and the occluding object. For example, if the first image includes an object positioned over a first color, and the second image includes the object positioned over a second color, adjustments may include a modification to a contrast property of the object in the first image if the contrast with the first color is less than the contrast with the second color. Some configurations disocclude backgrounds or objects having a solid color, e.g., textureless items. In one illustrative example, some configurations may select an object or background having a solid color to be disoccluded over the selection of an object or background having a textured surface. In such scenarios, techniques herein adjust at least one representation of an object that would result in the smallest change in contrast between a background and the occluding object.

The adjustment to the display properties may be applied with varying levels of intensity at specified times depending on one or more factors and/or contextual information interpreted from the images. For example, adjustments to the contrast property and/or any other modification to the images may be more prominent at certain distances. The prominence of the adjustment or modification may gradually decrease as the distance changes. In other configurations, the prominence of the adjustment or modification may also be based on time. For example, the prominence of the adjustment or modification may increase the longer an object appears at a given distance. In other examples described below, a minimal effect may be applied for objects that have relatively longer distance from the user and the effect may increase as the distance decreases.

In various configurations the effect may include one or more adjustments to an image of the object. In some illustrative examples, an image of the object can be faded, dimmed, and or blurred to the point where it is no longer visible in one eye. The gradual application of the effect may make the application of the effect minimally noticeable to the user, with one possible outcome being that the user notices nothing different from regular, binocular rendering at a comfortable distance.

By adjusting display properties, e.g., a contrast property, or modifying an image, e.g., obscuring one or more objects, a user may experience less eyestrain and/or fatigue. As will be described in more detail below, in some configurations, when one image is adjusted and/or obscured, issues with respect to the vergence-accommodation conflict may be reduced. These techniques may increase the performance of the user and reduce user errors when interacting with the device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for providing an improved stereoscopic display of objects will be described.

FIG. 1 is a system diagram showing aspects of one illustrative mechanism disclosed herein for providing an improved stereoscopic display of objects. As shown in FIG. 1, a system 100 may include a remote computer 101, a computing device 110 and a network 120. The computing device 110 may operate as a stand-alone device, or the computing device 110 may operate in conjunction with the remote computer 101. As can be appreciated, the remote computer 101 and the computing device 110 are interconnected through one or more local and/or wide area networks, such as the network 120. It should be appreciated that many more network connections may be utilized than illustrated in FIG. 1.

The computing device 110 may be in the form of a personal computer, a wearable computer, including an HMD, or any other device having components for causing a display of one or more objects on a display, such as an interface 118. The computing device 110 may include a local memory 180 that stores profile data 103 and application data 115, such as an output generated by techniques disclosed herein. The profile data 103 may store information describing user activity, preferences and other information used for providing an improved stereoscopic display of objects. For instance, a user profile may indicate a preference to have one or more techniques described herein applied to a particular image, e.g., the right eye over the other. The computing device 110 may also include a program module 111 configured to manage techniques described herein and interactions between a user and the computing device 110. The program module 111 may be in the form of a game application, a virtual reality application, an operating system component or any other application configured to display objects on a display.

In one illustrative example, the program module 111 is a game application that creates or allows a user to interact with a virtual world environment or an augmented reality environment. In another illustrative example, the program module 111 may be in the form of an operating system component or a productivity application.

The remote computer 101 may be in the form of a server computer or a number of server computers configured to store the profile data 103, application data 115 and other information associated with the user and the related applications. As can be appreciated, the remote computer 101 may store duplicate copies of the profile data 103 and the application data 115 allowing a centralized service to coordinate a number of client computers, such as the computing device 110.

Figure 2A:
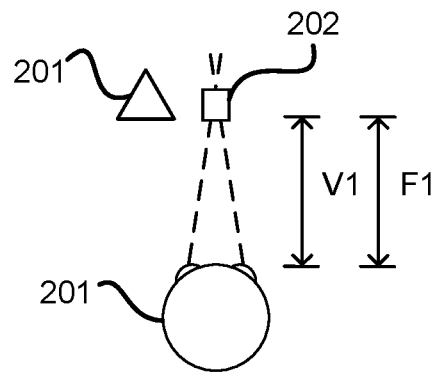
FIGS. 2A-2D illustrate diagrammatic models of objects in relation to a user's perspective and images that may be used to create stereoscopic display of objects.

Turning now to FIGS. 2A-2D, aspects of one illustrative example is shown. FIG. 2A illustrates a top view of an example scenario used to illustrate configurations disclosed herein. In FIG. 2A, a user 201 is positioned relative to a first object 201 and a second object 202 at a first vergence distance, V1. As also shown in FIG. 2A, the objects are also located at a focal distance, F1. For illustrative purposes, dashed lines illustrate the line of sight from a first eye, e.g., the right eye, of the user 201 to the second object 202; and the line of sight from a second eye, e.g., the left eye, of the user 201 to the second object 202.

Figure 2B:
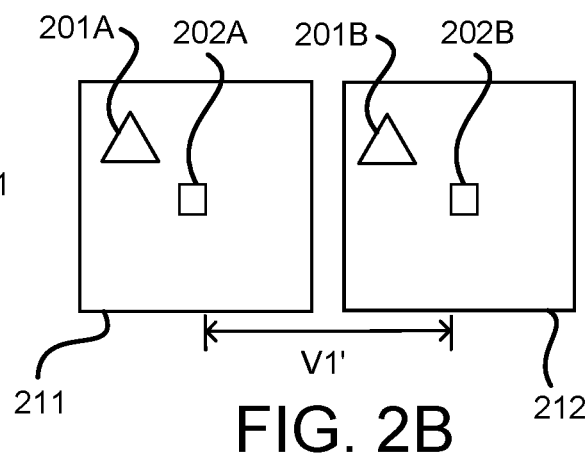

To provide a stereoscopic display of the scenario shown in FIG. 2A, a first image 211 of FIG. 2B displays a representation 201A of the first object 201 and a representation 202A of the second object 202. In addition, a second image 212 of FIG. 2B contains a representation 201B of the first object 201 and a representation 202B of the second object 202. FIG. 2B also illustrates a spacing, V1', between the representations (202A and 202B) of the second object 202, which varies in proportion with changes to the vergence distance, V1.

Figure 2C:
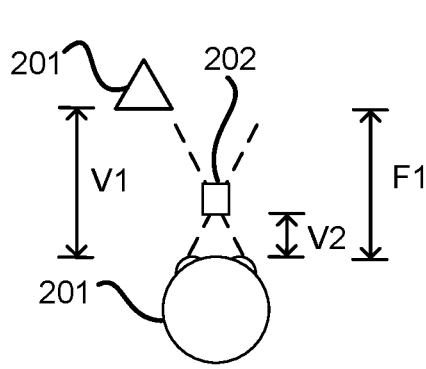
Figure 2D:
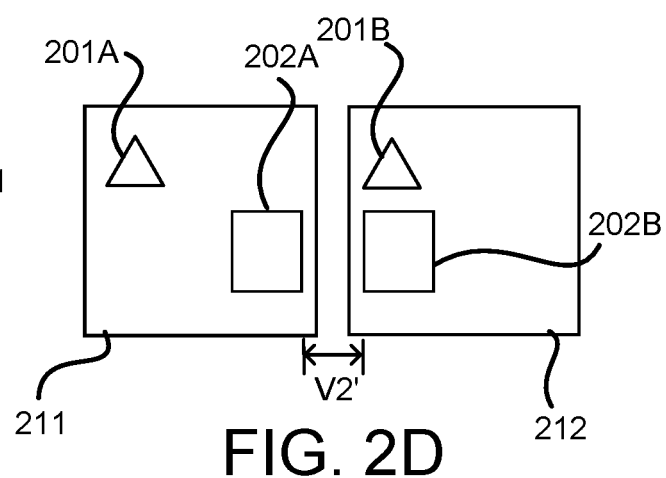

Given the scenario of FIG. 2C, the stereoscopic display of FIG. 2D illustrates a first image 211 containing a representation 201A of the first object 201 and a representation 202A of the second object 202. In addition, in FIG. 2D, a second image 212 contains a representation 201B of the first object 201 and a representation 202B of the second object 202. The second vergence distance, V2, of FIG. 2C is represented by the spacing, V2', in FIG. 2D between the representations (202A and 202B) of the second object 202.

For illustrative purposes, the scenarios presented in FIG. 2A and FIG. 2D have the same focal distance, F1. However, to simulate a scenario where the second object 202 is moving toward the user 201, the spacing between the representations is reduced, e.g., the spacing changes from V1' to V2'. This change simulates a change in the vergence distance, from V1 to V2, which also creates a difference between the vergence distance and the focal distance. As summarized above, this scenario may create an accommodation-vergence conflict. To address issues created by this conflict, the techniques presented herein modifies one or more images. Some examples of the techniques are illustrated in FIGS. 3A-3H and 4A-4D.

Figure 3A:
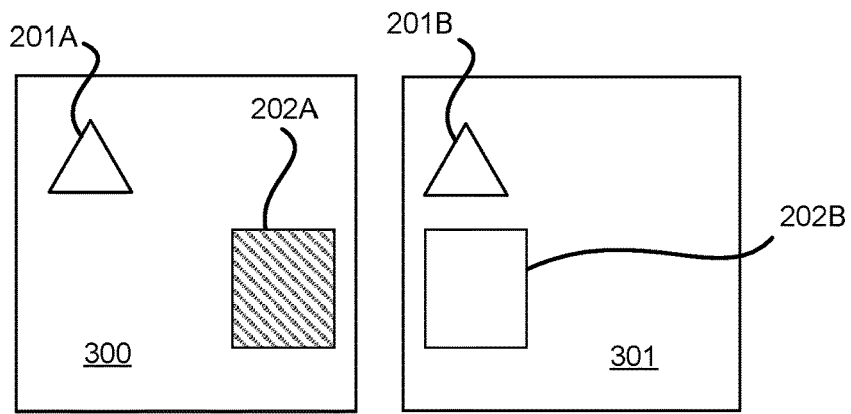
FIGS. 3A-3H illustrate various modifications that may be applied to one or more images used for generating a stereoscopic display of objects.
Figure 3B:
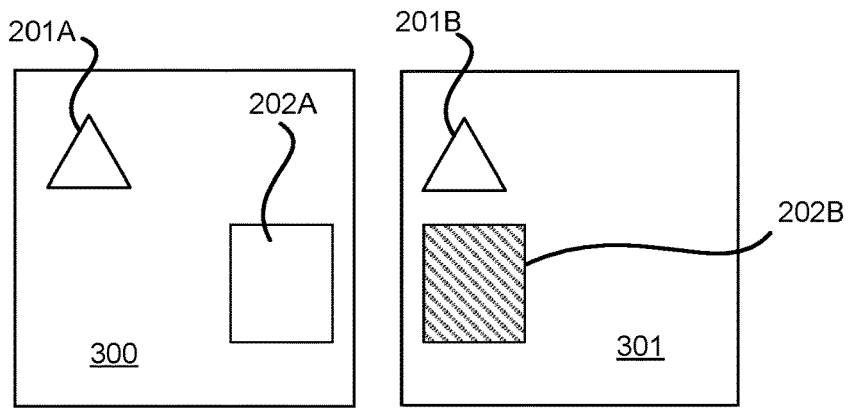

FIG. 3A illustrates an example where the system 100 obscures, modifies or otherwise adjusts the representation 202A of the object displayed the first image 300. FIG. 3B illustrates an example where the system 100 obscures or modifies the representation 202B displayed the second image 301. As summarized herein, either image may be selected for an adjustment based on one or more factors disclosed herein. In addition, the degree of the modification or adjustment may depend on one or more factors, such as a time period associated with the display of the object, the vergence distance for the object, the distance to the display's focal plane, contextual data interpreted from the images and/or any combination of these and other factors.

Figure 3C:
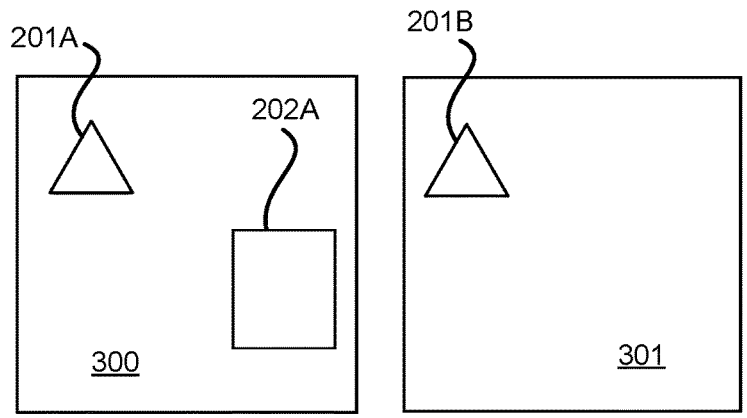
Figure 3D:
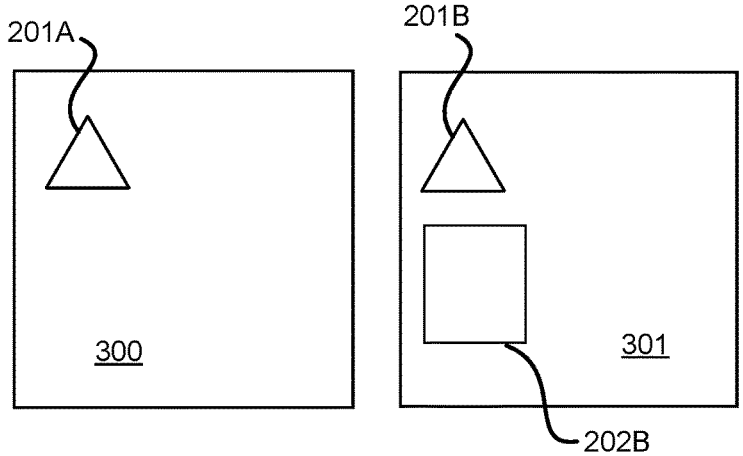

FIG. 3C illustrates an example where the system 100 fades the representation 202B displayed the second image 301. FIG. 3D illustrates an example where the system 100 fades the representation 202A displayed the first image 300. Similar to other examples described herein, either image or any object may be selected for fading based on one or more factors. The representations may fade over time, with a decay rate that depends on one more factors, such as a time period associated with the display of the object, the vergence distance for the object, the distance to the display's focal plane, contextual data interpreted from the images and/or any combination of these and other factors.

Figure 3E:
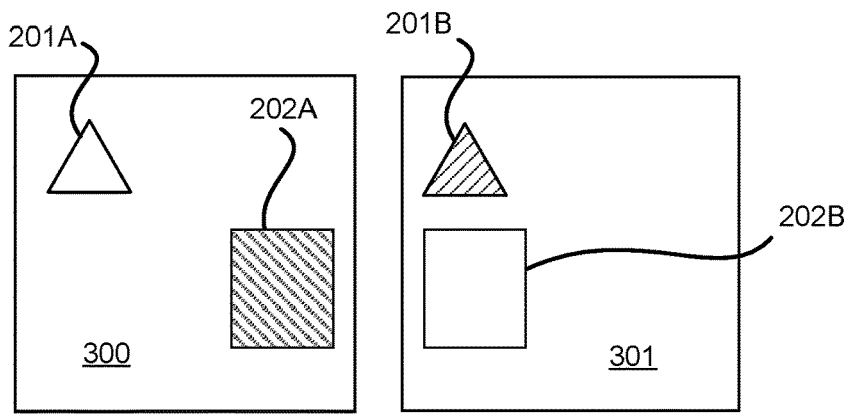
Figure 3F:
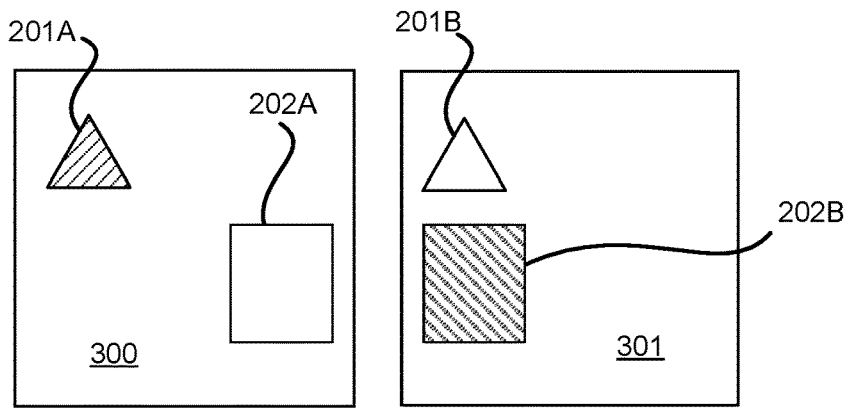

FIGS. 3E and 3F illustrate an example where the system 100 obscures, modifies or otherwise adjusts representations in the first image 300 and the second image 301. FIG. 3E illustrates an example where the system 100 obscures, modifies or otherwise adjusts the representation 202A of the second object 202 displayed the first image 300. In addition, the system 100 obscures, modifies or otherwise adjusts the representation 201B of the first object 201 displayed the second image 301. FIG. 3F illustrates an example where the system 100 obscures, modifies or otherwise adjusts the representation 201A of the first object displayed the first image 300. In addition, the system 100 obscures, modifies or otherwise adjusts the representation 202B of the second object displayed the second image 301. In configurations where multiple objects are selected for a modification or adjustment, techniques may analyze the input data to generate contextual information. The contextual information may then be used to select a primary object or other objects. In addition, any object in any image may be selected for a modification or adjustment based on one or more factors disclosed herein. In addition, the degree of the modification or adjustment may depend on one or more factors.

Figure 3G:
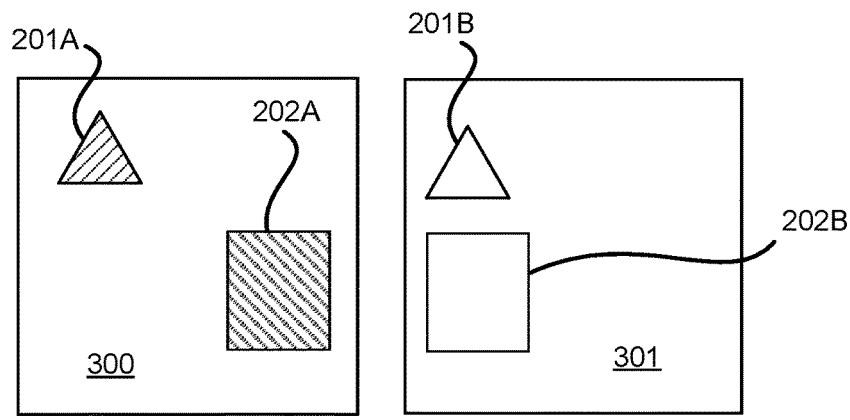
Figure 3H:
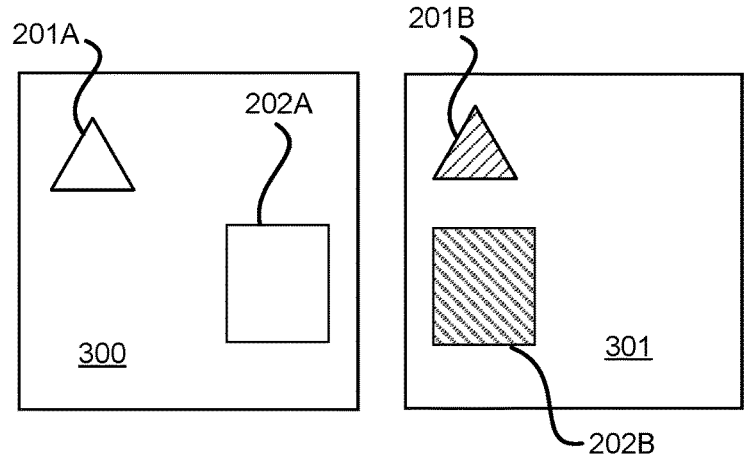

FIGS. 3G and 3H illustrate an example where the system 100 obscures, modifies or adjusts more than one representation in each image. FIG. 3G illustrates an example where the system 100 obscures, modifies or otherwise adjusts the representation 201A of the first object 201 and the representation 202A of the second object 202 displayed the first image 300. FIG. 3H illustrates an example where the system 100 obscures, modifies or otherwise adjusts the representation 201B of the first object 201 and the representation 202B of the second object 202 displayed the second image 301.

In any of the examples provided herein, the selection of the object and/or the image to adjust or otherwise modify may depend on one or more factors stated herein. In some configurations, the selection of the object and/or image to adjust, and/or the degree in which the adjustment is applied, depends on one or more factors. As summarized above, some of the factors may include a time period associated with the display of the object, the vergence distance for the object, the distance to the display's focal plane, contextual data interpreted from the images and/or any combination of these and other factors.

In configurations where fading of one or more representations occurs, the fading may be applied with a gradual application of the effect. The speed in which the fading is applied may make the application of the effect minimally noticeable to the user. In addition, the fading may be directly associated with the vergence distance, e.g., a representation becomes more obscured as the vergence distance is reduced. Other examples may apply an effect based on a function of the vergence distance and time a representation is displayed. In such an example, a vergence distance may rapidly decrease, but an effect may not be applied until after a predetermined period of time after the vergence distance has changed. As stated above, these examples are not to be construed as limiting, as any factor, and combinations thereof, are within the scope of the present disclosure.

As summarized above, some properties, such as a contrast ratio between an object and a background object, may be used to determine which object and/or image to adjust. In some illustrative examples, some configurations may be based on the amount of overlap an object has with a background. FIGS. 4A-4D illustrate one example of this scenario and applicable techniques.

FIG. 4A illustrates a stereoscopic view of the second object 202, which is displayed as a first representation 202A in the first image 300 and a second representation 202B in the second image 301. In addition, the first image 300 also displays a first representation 401A of a background in the first image 300 and a second representation 401B of the background in the second image 301. The arrangement shown in FIG. 4A may represent a scenario where the background object is off-center with respect to the second object 202. Such a scenario may create an output such as the example shown in FIG. 4A, where the first representation 202A of the object overlaps the first representation 401A of the background. Also shown in FIG. 4A, the second representation 202B of the object only partially overlaps the second representation 401B of the background.

As summarized above, the contrast between an object and a background may influence the selection of the image and/or the type of adjustment that is applied to the images. For example, in FIG. 4B, since the second representation 202B of the object only partially overlaps the second representation 401B of the background, the adjustment is applied to the second representation 202B of the object in the second image 301. In such an example, the second representation 202B of the object may be adjusted in a number of ways. In some examples the contrast may be adjusted, the representation may be blurred, or other adjustments disclosed herein may be applied. In other examples, the transparency of the representation may be adjusted. For instance, a representation of an object may become more transparent or completely transparent depending on one or more factors. Among other factors described herein, the transparency of a representation may be modified based on a time period associated with the display of the object, the vergence distance for the object, the distance to the display's focal plane, contextual information interpreted from the images and/or any combination of these and other factors.

FIG. 4C shows another example where the second representation 202B of the object may be configured to fade over time. FIG. 4D shows yet another example where the first representation 401A of the background may be configured to fade over time. These examples are provided for illustrative purposes and are not construed to be limiting. It can be appreciated that any adjustment or modification may be applied to any representation on any image based on one or more factors.

Figure 5:
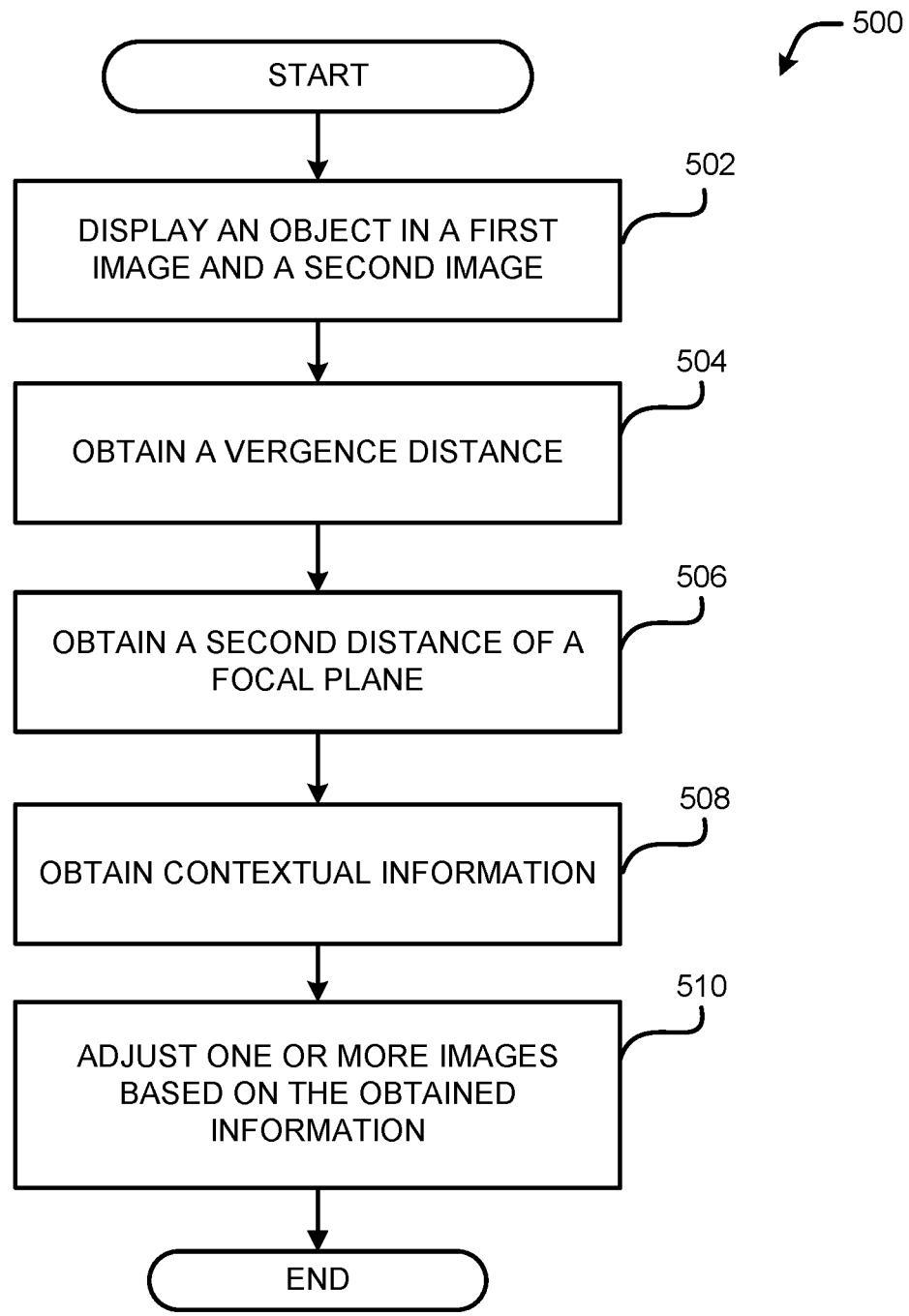
FIG. 5 is a flow diagram of one example routine that may be used for providing an improved stereoscopic display of objects.

Turning now to FIG. 5, aspects of a routine 500 for providing an improved stereoscopic display of objects are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 1, the operations of the routine 500 are described herein as being implemented, at least in part, by an application, component and/or circuit, such as the program module 111 and/or the server module 107. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where the program module 111 displays representations of an object in a first image and a second image. One example is shown in FIG. 2B, where a first representation 202A of the second object 202 is displayed in a first image 211, and a second representation 202B of the second object 202 is displayed in a second image 212. Although the illustrations described herein refer to two images, it can be appreciated that the techniques described herein may apply to any stereographic display of an object, whether on one image or multiple images.

Next, at operation 504, the program module 111 obtains a vergence distance. The vergence distance may be obtained from any resource and/or calculated from received data. In some configurations, the vergence distance of an object is received with the input data defining the object.

Next, at operation 506, the program module 111 obtains a focal distance. As can be appreciated, the focal distance may be obtained from any resource and/or calculated from received data. In some configurations, the focal distance of an object is received with the input data defining the object.

Next, at operation 506, the program module 111 may obtain contextual information. Contextual information may be received from one or more resources, such as the input data, or the contextual information may be derived from a process configured to interpret the input data or other data related to the displayed object. For instance, known algorithms may analyze input data to determine general shapes and/or identify categories of objects, e.g., people, buildings, animals, to generate contextual information. Contextual information may also be obtained by other sources, such as an input from a user. The system 100 may select an object or background to obscure, modify or otherwise adjust based on the contextual information.

Next, at operation 510, the program module 111 processes the obtained information to adjust one or more images. As illustrated in many examples described herein, one or more factors may be used to select an image, object or background to adjust and determine a degree in which an adjustment is to be applied. As summarized herein, some example factors may include a time period associated with the display of the object, the vergence distance for the object, the distance to the display's focal plane, contextual data interpreted from the images and/or any combination of these and other factors. For example, adjustments to a contrast property and/or any other modification to the images may be more prominent at certain distances. The prominence of the adjustment or modification may gradually decrease as the distance changes. In other configurations, the prominence of the adjustment or modification may also be based on time, or time in combination with a particular vergence distance and/or focal distance.

Figure 6:
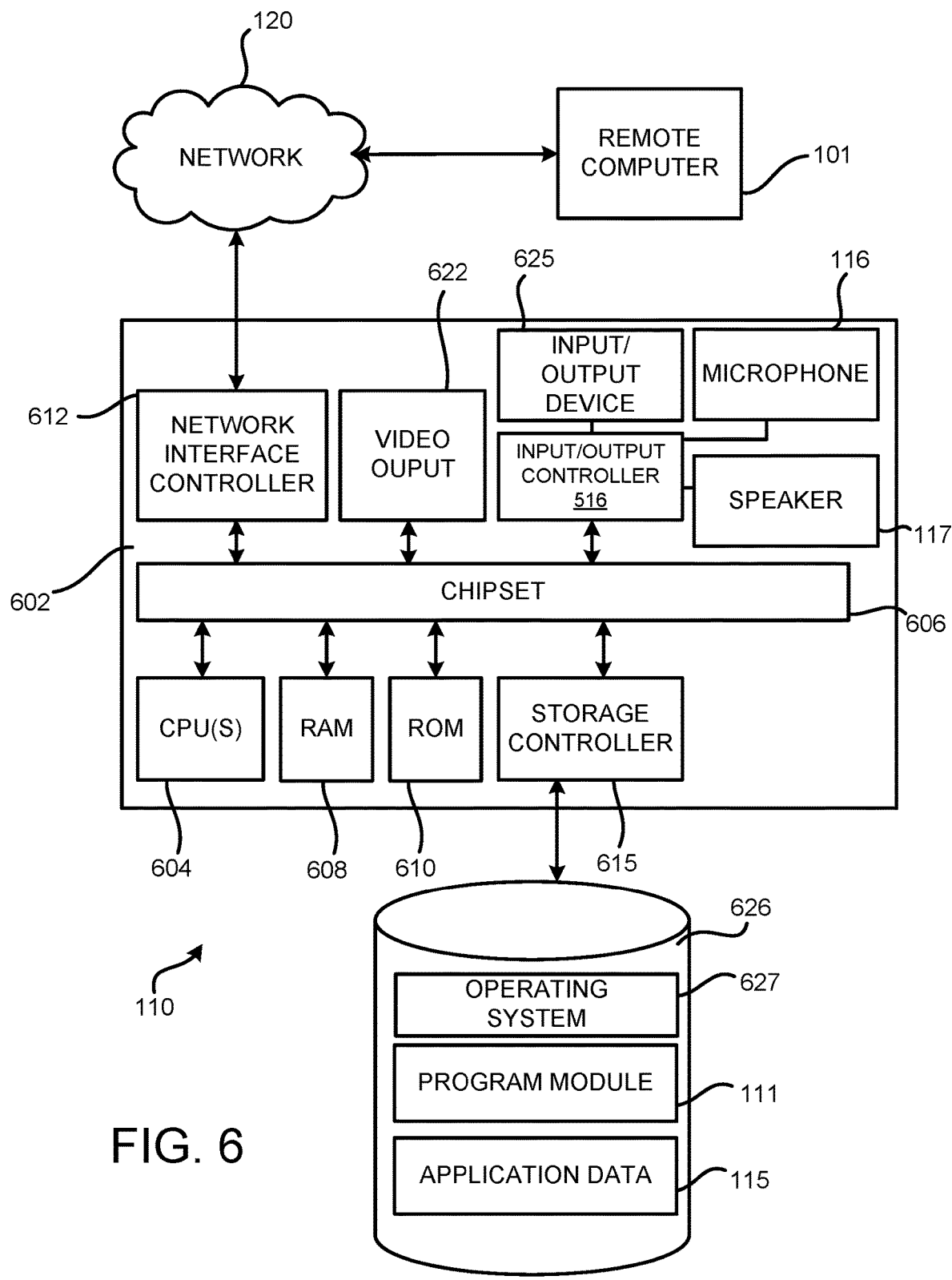
FIG. 6 is a computer architecture diagram showing an illustrative computer hardware and software architecture for a computing device capable of implementing aspects of the configurations presented herein.

FIG. 6 shows additional details of an example computer architecture for the components shown in FIG. 1 capable of executing the program components described above for providing an improved stereoscopic display of objects. The computer architecture shown in FIG. 6 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing device 110, it can be appreciated that such components, and other components may be part of the remote computer 101.

The computing device 110 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 110.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 110. The chipset 606 may further provide an interface to a computer-readable storage medium such as a read-only memory ("ROM") 610 or non-volatile RAM ("NVRAM") for storing basic routines that help to startup the computing device 110 and to transfer information between the various components and devices. The ROM 610 or NVRAM may also store other software components necessary for the operation of the computing device 110 in accordance with the embodiments described herein.

The computing device 110 may operate in a networked environment using logical connections to remote computing devices and computer systems through a network, such as the local area network 120. The chipset 606 may include functionality for providing network connectivity through a network interface controller (NIC) 612, such as a gigabit Ethernet adapter. The NIC 612 is capable of connecting the computing device 110 to other computing devices over the network 120. It should be appreciated that multiple NICs 612 may be present in the computing device 110, connecting the computer to other types of networks and remote computer systems. The network 120 allows the computing device 110 to communicate with remote services and servers, such as the remote computer 101. As can be appreciated, the remote computer 101 may host a number of services such as the XBOX LIVE gaming service provided by MICROSOFT CORPORATION of Redmond Wash. In addition, as described above, the remote computer 101 may mirror and reflect data stored on the computing device 110 and host services that may provide data or processing for the techniques described herein.

The computing device 110 may be connected to a mass storage device 626 that provides non-volatile storage for the computing device. The mass storage device 626 may store system programs, application programs, other program modules, and data, which have been described in greater detail herein. The mass storage device 626 may be connected to the computing device 110 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 110 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 110 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 may further read information from the mass storage device 626 by detecting the physical states or characteristics of one or more particular locations within the physical storage units.

In addition to the mass storage device 626 described above, the computing device 110 may have access to other computer-readable media to store and retrieve information, such as program modules, data structures, or other data. Thus, although the program module 111, application data 115 and other modules are depicted as data and software stored in the mass storage device 626, it should be appreciated that these components and/or other modules may be stored, at least in part, in other computer-readable storage media of the computing device 110. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 110.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 110. For purposes of the claims, the phrase "computer storage medium," and variations thereof, does not include waves or signals per se and/or communication media.

The mass storage device 626 may store an operating system 627 utilized to control the operation of the computing device 110. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing device 110, such as the program module 111, application data 115 and/or any of the other software components and data described above. The mass storage device 626 might also store other programs and data not specifically identified herein.

In one embodiment, the mass storage device 626 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 604 transition between states, as described above. According to one embodiment, the computing device 110 has access to computer-readable storage media storing computer-executable instructions which, when executed by the computing device 110, perform the various routines described above with regard to FIG. 5 and the other figures. The computing device 110 might also include computer-readable storage media for performing any of the other computer-implemented operations described herein.

The computing device 110 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 116, a speaker 117, game controllers and/or audio devices. In addition, or alternatively, a video output 622 may be in communication with the chipset 606 and operate independent of the input/output controllers 616. It will be appreciated that the computing device 110 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause 1: A computer-implemented method, comprising displaying, at a computing device, a first image of an object on a display device; displaying, at the computing device, a second image of the object on the display device; obtaining data indicating the vergence distance of the object; and adjusting at least one display property of at least one image of the first image and the second image based on, at least in part, the vergence distance of the object.

Clause 2: The computer-implemented method of clause 1 further comprising obtaining contextual information related to the object, and wherein adjusting the at least one display property of the at least one image is also based on, at least in part, the contextual information.

Clause 3: The computer-implemented method of clauses 1-2, wherein at least one image of the first image or the second image includes a second object, wherein the method further comprises: obtaining contextual information related to the object or the second object, wherein adjusting the at least one display property of the at least one image includes adjusting a display property of the object in the first image based, at least in part, on the contextual information.

Clause 4: The computer-implemented method of clauses 1-3, wherein adjusting the at least one display property of the at least one image includes adjusting a display property of the second object in the second image based, at least in part, on the contextual information.

Clause 5: The computer-implemented method of clauses 1-4, wherein adjusting the at least one display property includes an adjustment of a contrast property of the at least one image of the first image and the second image.

Clause 6: The computer-implemented method of clauses 1-5, wherein adjusting at least one display property comprises: obtaining a focal distance associated with the rendered object; determining if a difference between the focal distance and the vergence distance exceeds a threshold; and adjusting the at least one display property if the difference between the focal distance and the vergence distance exceeds the threshold.

Clause 7: The computer-implemented method of clauses 1-6, wherein a prominence associated with adjusting of the at least one display property is based on, at least in part, the difference between the focal distance and the vergence distance.

Clause 8: The computer-implemented method of clauses 1-7, wherein a prominence associated with adjusting of the at least one display property is based on, at least in part, the vergence distance.

Clause 9: A computing device, comprising: a processor; a memory having computer-executable instructions stored thereupon which, when executed by a computing device, cause the computing device to cause a display of a first image of an object; cause a display of a second image of the object; obtain a vergence distance of the object; obtain a distance to a focal plane; adjust at least one contrast property of the first image of the object, if a difference between the vergence distance and the distance to the focal plane exceed a threshold.

Clause 10: The computing device of clause 9, wherein a prominence associated with adjusting the at least one contrast property is based on, at least in part, the difference between the focal distance and the vergence distance.

Clause 11: The computing device of clauses 9-10, wherein a prominence associated with adjusting the at least one contrast property is based on, at least in part, a time associated with the display of the first image or the second image.

Clause 12: The computing device of clauses 9-11, wherein a prominence associated with adjusting the at least one contrast property is based on, at least in part, a time associated with the display of the first image or the second image and the difference between the focal distance and the vergence distance.

Clause 13: The computing device of clauses 9-12, wherein the memory has further computer-executable instructions, which cause the computing device to: obtain contextual information related to the object; and adjust the at least one contrast property of the at least one image based on, at least in part, the contextual information.

Clause 14: The computing device of clauses 9-13, wherein at least one image of the first image or the second image includes a second object, and wherein the memory has further computer-executable instructions, which cause the computing device to obtain contextual information related to the object or the second object, wherein adjusting the at least one contrast property includes adjusting a display property of the object, at least in part, on the contextual information.

Clause 15: The computing device of clauses 9-14, wherein adjusting the at least one contrast property of the at least one image includes adjusting a display property of the second object in the second image based, at least in part, on the contextual information.

Clause 16: The computing device of clauses 9-15, wherein adjusting the at least one contrast property includes an adjustment of a contrast property the first image and a contrast property of the second image.

Clause 17: A computer storage medium having computer-executable instructions stored thereupon which, when executed by a computing device, cause the computing device to: display a first image of an object on a display device; display a second image of the object on a display device; obtain data indicating a time the object is displayed at a vergence distance; and adjusting at least one display property of at least one image of the first image and the second image based on, at least in part, the data indicating the time and the data indicating the vergence distance.

Clause 18: The computer-readable storage medium of clause 17, wherein a prominence associated with adjusting the at least one display property is based on, at least in part, the data indicating the time and the vergence distance.

Clause 19: The computer-readable storage medium of clauses 17-18, wherein a prominence associated with adjusting the at least one display property is based on, at least in part, an input provided by a user.

Clause 20: The computer-readable storage medium of clauses 17-19, wherein the computer storage medium has further computer-executable instructions, which cause the computing device to: obtain contextual information related to the object; and adjust the at least one display property of the at least one image based on, at least in part, the contextual information or user preference data.

Based on the foregoing, it should be appreciated that technologies for providing an improved stereoscopic display of objects are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
   displaying a first image of an object on a display device, wherein the first image is aligned with a first eye of a user;
   displaying a second image of the object on the display device, wherein the second image is aligned with a second eye of the user;
   obtaining data indicating a vergence distance associated with the object; and
   adjusting a display property of the first image to obscure the display of the object to the first eye without adjusting a display property of the object in the second image aligned with the second eye as the vergence distance is reduced, wherein adjusting the display property of the first image obscures the display of the object to the first eye of the user without obscuring the display of the object to the second eye of the user reduces eyestrain.

2. The method of claim 1, wherein adjusting the display property of the first image comprises blurring the first image to obscure the display of the object to the first eye, without blurring the second image aligned with the second eye, as the vergence distance is reduced.

3. The method of claim 1, further comprising:
obtaining data indicating a time the object is displayed at the vergence distance; and
adjusting the display property of the first image obscure the display of the object to the first eye after determining that the object is displayed at the vergence distance for at least a predetermined time.

4. The method of claim 1, wherein adjusting the display property of the first image comprises fading the first image of the object without fading the second image aligned with the second eye.

5. The method of claim 4, wherein a fading level applied to the first image aligned with the first eye is increased as the vergence distance is reduced.

6. The method of claim 1, wherein adjusting the display property of the first image comprises adjusting a contrast property of the first image of the object.

7. The method of claim 6, wherein adjusting the contrast property reduces a prominence of the display of the object as the vergence distance is reduced.

8. The method of claim 6, wherein adjusting the contrast property increasing a prominence of the display of the object as the vergence distance is increased.

9. A computing device, comprising:
a processor;
a memory having computer-executable instructions stored thereupon which, when executed by a computing device, cause the computing device to
display a first image of an object on a display device, wherein the first image is aligned with a first eye of a user;
display a second image of the object on the display device, wherein the second image is aligned with a second eye of the user;
obtain data indicating a vergence distance associated with the object;
adjust a display property of the first image to obscure the display of the object to the first eye without adjusting a display property of the object in the second image aligned with the second eye as the vergence distance is reduced, wherein adjusting the display property of the first image obscures the display of the object to the first eye of the user without obscuring the display of the object to the second eye of the user reduces eyestrain.

10. The computing device of claim 9, wherein adjusting the display property of the first image comprises blurring the first image to obscure the display of the object to the first eye, without blurring the second image aligned with the second eye, as the vergence distance is reduced.

11. The computing device of claim 9, wherein the computer-executable instructions further cause the computing device to:
obtain data indicating a time the object is displayed at the vergence distance; and
adjust the display property of the first image in response to determining that the object is displayed at the vergence distance for the predetermined time.

12. The computing device of claim 9, wherein adjusting the display property of the first image comprises fading the first image of the object.

13. The computing device of claim 12, wherein a fading level is increased as the vergence distance is reduced.

14. The computing device of claim 9, wherein adjusting the display property of the first image comprises adjusting a contrast property for reducing a prominence of the first image of the object as the vergence distance is reduced.

15. A computer storage medium having computer-executable instructions stored thereupon which, when executed by a computing device, cause the computing device to:
display a first image of an object on a display device, wherein the first image is aligned with a first eye of a user;
display a second image of the object on the display device, wherein the second image is aligned with a second eye of the user;
obtain data indicating a vergence distance associated with the object;
adjust a display property of the first image to obscure the display of the object to the first eye without adjusting a display property of the object in the second image aligned with the second eye as the vergence distance is reduced, wherein adjusting the display property of the first image obscures the display of the object to the first eye of the user without obscuring the display of the object to the second eye of the user reduces eyestrain, wherein adjusting the display property of the first image obscures the display of the object further as the vergence distance is reduced.

16. The computer storage medium of claim 15, wherein the computer-executable instructions further cause the computing device to:
obtain data indicating a time the object is displayed at the vergence distance; and
adjust the display property of the first image in response to determining that the object is displayed at the vergence distance for the predetermined time.

17. The computer storage medium of claim 15, wherein adjusting the display property of the first image comprises fading the first image of the object aligned with first eye, without fading the second image of the object aligned with the second eye.

18. The computer storage medium of claim 17, wherein a fading level of the first image is increased as the vergence distance is reduced.

19. The method of claim 1, wherein the display of the object to the first eye is further obscured as the vergence distance is reduced, and wherein the method further comprises:
obtaining data indicating a time the object is displayed at the vergence distance; and
adjusting the display property of the first image to obscure the display of the object to the first eye after determining that the object is displayed at the vergence distance for at least a predetermined time.

20. The method of claim 1, wherein the display of the object to the first eye is further obscured as the vergence distance exceeds a threshold, and wherein the method further comprises:
obtaining data indicating a time the object is displayed at the second vergence distance; and
adjusting the display property of the first image to obscure the display of the object to the first eye after determining that the object is displayed at the second vergence distance for at least a predetermined time.

\* \* \* \* \*